April 7, 1931. F. BROOK 1,799,154
MOTION PICTURE PROJECTION APPARATUS
Filed Dec. 15, 1927 3 Sheets-Sheet 1

Inventor
Frederick Brook
By B. Singer Atty.

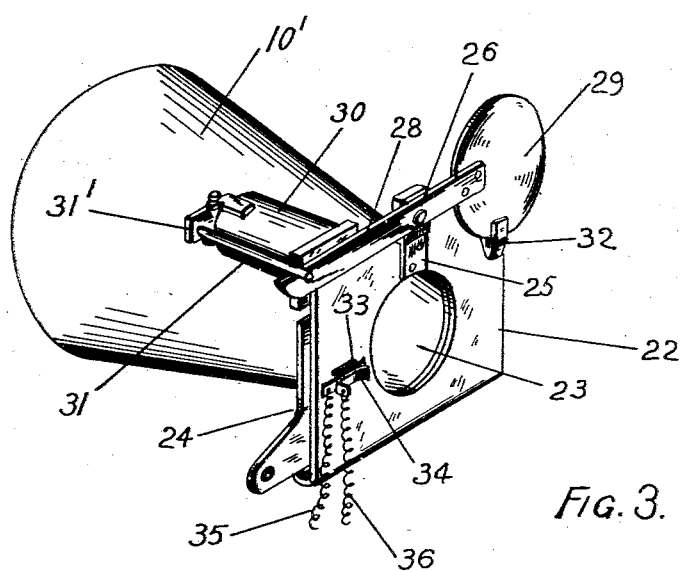
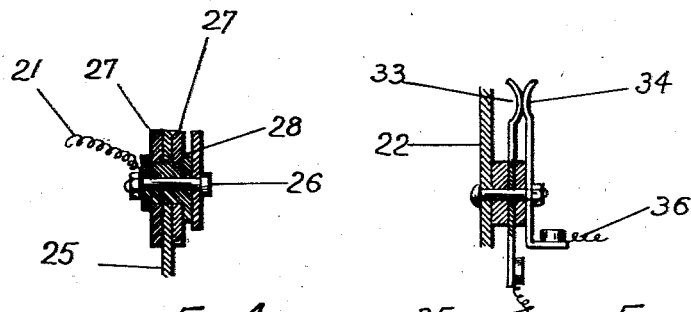

April 7, 1931.  F. BROOK  1,799,154

MOTION PICTURE PROJECTION APPARATUS

Filed Dec. 15, 1927  3 Sheets-Sheet 3

Inventor
Frederick Brook
By D. Singer, Atty.

UNITED STATES PATENT OFFICE

FREDERICK BROOK, OF GILGANDRA, AUSTRALIA

MOTION-PICTURE-PROJECTION APPARATUS

Application filed December 15, 1927, Serial No. 240,259, and in Australia September 21, 1927.

The risk of a broken biograph film igniting if a part of it remains in the path of the rays from the projector is recognized, and it is usual practice to provide against this risk a safeguard which consists of a shield designed and adapted to be manually operated by an assistant to the operator, and interposed, in cases of emergency, between the projector and the gate through which the film passes across the path of the rays. This safeguard is effective provided that it is manipulated almost instantaneously with the breaking of the film, but this is not always practicable.

It is an object of this invention to provide means whereby in the event of a film breaking, a safety shutter or shield is automatically and instantaneously interposed in the path of the rays between the projector and the film to prevent the latter from catching fire, thus in this regard eliminating the human element.

It is another object of this invention to provide means whereby, under the same circumstances, the projection aperture and the peep hole in the wall of the biograph room are automatically closed to prevent people in the auditorium from viewing therethrough the interior of the room and, in case of an outbreak of fire due to the breaking of a film in the machine, becoming panic stricken.

My invention consists in the combination and arrangement with the projector, gate, film, motor and film-progressing mechanism as usual in biograph apparatus, of a movable shutter or shield controlled by an electric relay, solenoid or other functionally equivalent device in an electric circuit which is itself controlled by the film, that is to say the film while intact functions as an electric insulator between contact points in the circuit, so holding the circuit open, or, alternatively functions as means closing the contact points to close the circuit, the breaking of the film permitting the contacts to close or open. The arrangement depends on the co-operative combination of the relay and the shield and on the mounting of the latter. The purpose of the relay is to move the shield or permit it to move into position in front of the projector and thus obstruct the rays therefrom should the film break, or to hold the shield in retracted position.

In the arrangement wherein the intact film functions to hold the circuit open, the shield, normally held in inoperative or unobstructive position, is moved or permitted to move under the influence of a spring or gravity or both, by the relay which is normally inactive but energized on the closure of the circuit due to the breaking of the film. The energized relay acts directly to move the shield, or to release a detent catch normally holding the shield in retracted position, and thus permit it to move into its functional position, when the relay circuit is automatically opened.

In the arrangement wherein the intact film functions to close the circuit, the normally energized relay operates directly to hold the shield in retracted position or to hold a detent in position to retain the shield in that position, so that on the opening of the circuit consequent on the breaking of the film, the de-energization of the relay permits the shield to move to obstructive position.

The contacts referred to are so located that they are controlled by that portion of the film which at any time is passing through the film guide where breakage of the film is most likely to occur, and one at least of the contacts is of spring type while the other if not of spring type is constituted by any suitable and convenient part of the film guide frame or of the mechanism associated therewith such as the "Maltese-cross".

In the first mentioned arrangement of the circuit, the film passes between the contact points to normally insulate them from each other, while in the other arrangement one at least of the contacts is carried on the longer end of a pivoted lever of which the shorter end is controlled by the film, the latter passing between said shorter end and a fixed abutment or the shorter end of another lever carrying the complementary contact. These levers are so constructed and arranged that when their shorter ends are parted by the interposed film, the contacts on their other ends are closed, and when, on the breakage or removal of the film, their shorter ends meet, the contacts are opened. The contacts being on the longer ends of the levers, their movement is amplified or increased relatively to that of the shorter ends, the movement of the latter under the circumstances described being no greater than the thickness of the film.

The second object of my invention is achieved by means of shutters controlled or actuated by means of relays in an electric circuit which is opened by the breaking of the film. This circuit may include the motor so that the latter stops when the film breaks, while the active relays which normally retain the shutters in open position, are de-energized and permit the shutters, under influence of gravity or springs, to close over the peep hole and projection aperture in the wall of the biograph room.

In the hereinbefore mentioned arrangement wherein the relay controlling the fire-protection shield is in a circuit which is opened by the breaking of the film, the relays controlling the shutters of the peep hole and projection aperture, are in the same circuit, so that all these relays are de-energized should the film break. On the other hand, if the relay controlling the fire projection shield is in a circuit which is closed by the breakage of the film, the shutter relays are in a different circuit which is opened as the other is closed. In this last mentioned form of the invention the shutter circuit includes two normally closed spring contacts, and the fire shield carries a wedge block of insulating material, these parts being so relatively arranged that as the fire shield moves into obstructing position the wedge block separates the two contacts in the shutter circuit thus opening the latter. The shutter relays then being de-energized permit the shutters to move into closed position.

As the projector arc-lamp circuit usually carries a different current to that in the motor circuit, it is convenient and appropriate to utilize these two circuits independently for the purposes of my invention as hereinafter more fully ascertained. It is also desirable and preferable, in regard to the circuit controlling the fire-shield to employ the intact film as a circuit breaking medium this arrangement being more simple, and to include other means whereby the last mentioned circuit is opened after the fire-shield has moved to functional position so that this circuit remains dead until all parts are restored to normal position.

To more completely describe my invention reference will now be made to the accompanying drawings which depict more or less diagrammatically certain parts of moving picture projection outfit equipped or fitted with safeguarding means according to this invention in its preferred form. In the drawings Fig. 1 is a side elevation partly in section, not including the electric leads;

Fig. 3 is a perspective view of the cone and of the projector and the parts of my safeguarding means immediately associated therewith;

Fig. 4 is a sectional detail showing the manner of insulating the pivot pin about which the fire shield turns when moved to or from normal position;

Fig. 5 is a sectional detail showing two normally closed contacts in the circuit controlling the solenoids actuating the shutters of the peep-hole and projection aperture in the wall of the operating room;

Figure 1:
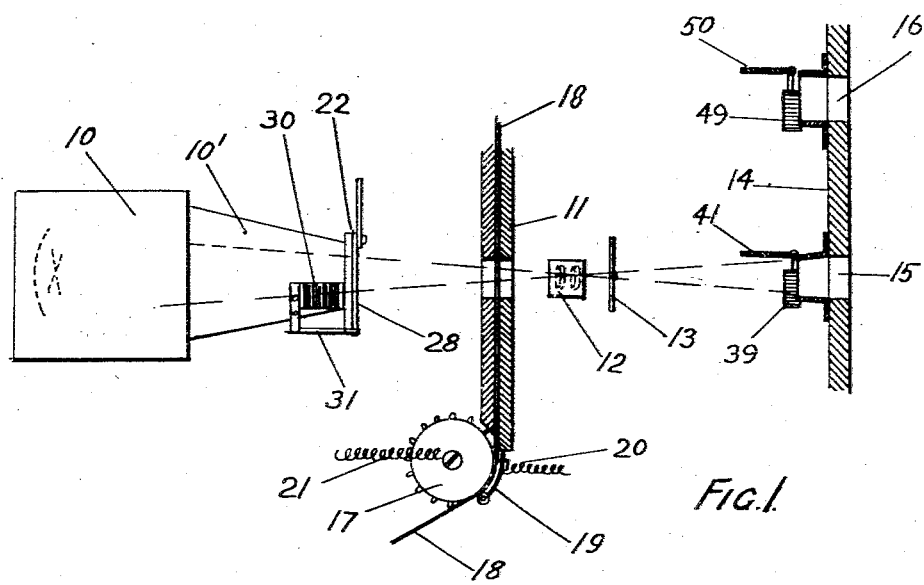

Referring to Fig. 1, 10 indicates the projector, 11 the guide for the film in the path of the light beam, 12 the lens, 13 the biograph shutter, 14 the front wall of the operating room, 15 the projection aperture therein, 16 the peep hole, 17 the Maltese cross and 18 the film passing through the gate and engaged by the Maltese cross. These parts are as usual in biograph apparatus. Other parts shown in this figure and indicated by reference numerals are more particularly described hereinafter in reference to the other figures of the drawings.

Figure 2:
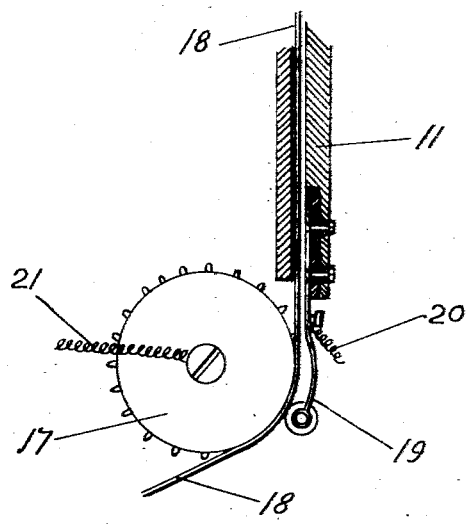
Fig. 2 is an elevation partly in section showing the "Maltese cross", portion of the film guide and portion of the intact film positioned to break the electric circuit.

Referring to Fig. 2, the film guide 11 carries a spring contact 19 to which an electric lead 20 is connected, the complementary contact being constituted by the Maltese cross 17. While the film is intact and passing through the guide, these contacts are separated by it as shown. A lead 21 makes electrical contact with the Maltese cross.

Referring to Fig. 3 the cone end $10^1$ of the projector carries a plate 22 with aperture 23 and is equipped with the usual hand operated fire shield or guard 24. Fixed on this plate 22 is a bracket or support 25 which carries a pivot pin 26 insulated from the bracket by bushing 27 (see Fig. 4), and to this pivot pin is connected electric lead 21 before referred to. Oscillatably mounted on pin 26 is a lever 28 on one end of which is the fire-shield 29.

Also mounted on plate 22 is a solenoid 30 to the pivoted armature $31^1$ of which is attached a rod 31 which when the solenoid is de-energized and the parts are in the position shown in Fig. 3 engages lever 28 and holds it in horizontal position, but when the solenoid is energized as hereinafter explained, the movement of its armature withdraws rod 31 from lever 28 thus permitting the fire-shield 29 (by its weight) to turn lever 28 on the pivot pin 26 and assume a position over the aperture 23 in plate 22 to intercept the beam of light from the arc lamp in the projector. Fixed on the fire shield 29 is a wedge shaped block 32 of insulating material positioned to enter between and separate two normally closed contacts 33 and 34 when the fire shield assumes its functional position over aperture 23. These contacts 33 and 34 are affixed to, but insulated from plate 22 (see Fig. 5) and are connected respectively to electric leads 35 and 36.

Figures 6, 7:
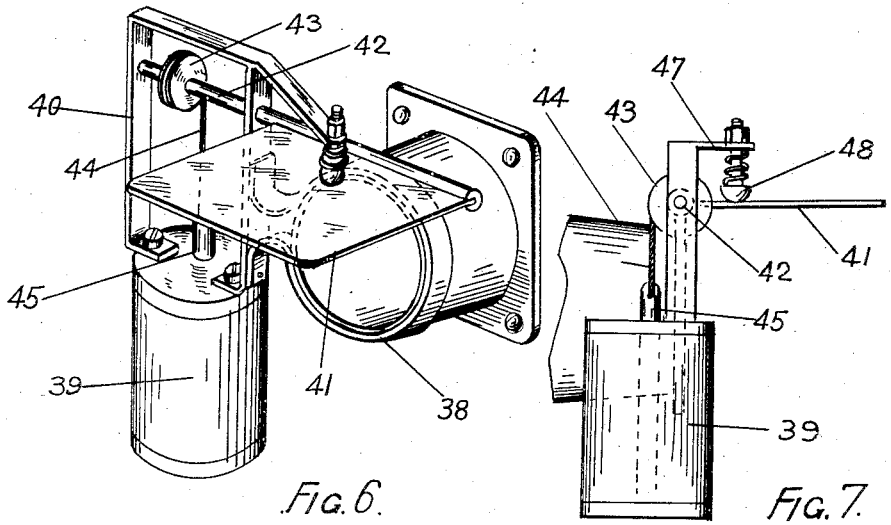
Fig. 6 is a perspective view showing one of the shutters, the solenoid associated therewith and the connecting mechanism.
Fig. 7 is a side elevation of the construction depicted in Fig. 6.

Referring to Figs. 6 and 7, 38 is a flanged hollow cone attached to the wall 14 (see Fig. 1) of the operating room in register with the projection hole 15 therein, 39 a solenoid, 40 a framing attached to the solenoid, and 41 a shutter fixed on a spindle 42 rotatably mounted in the framing 40. On the spindle 42 is a pulley 43 on which is fixed one end of a cord 44, the other end being attached to the core 45 of the solenoid. On an extension arm 47 of the framing 40 is a spring backed buffer 48 which limits the movement of shutter 41 in an upward direction.

The operation of these parts is as follows:—

When a solenoid 39 is energized the retraction of its core 45 pulls cord 44 to rotate spindle 42 and raise shutter 41 to the position shown against the buffer 48, but when solenoid 39 is de-energized the overhanging weight of shutter 41 causes it to assume a vertical position over the end of cone 38, at the same time rotating spindle 42 to raise the solenoid core 45.

Figure 8:
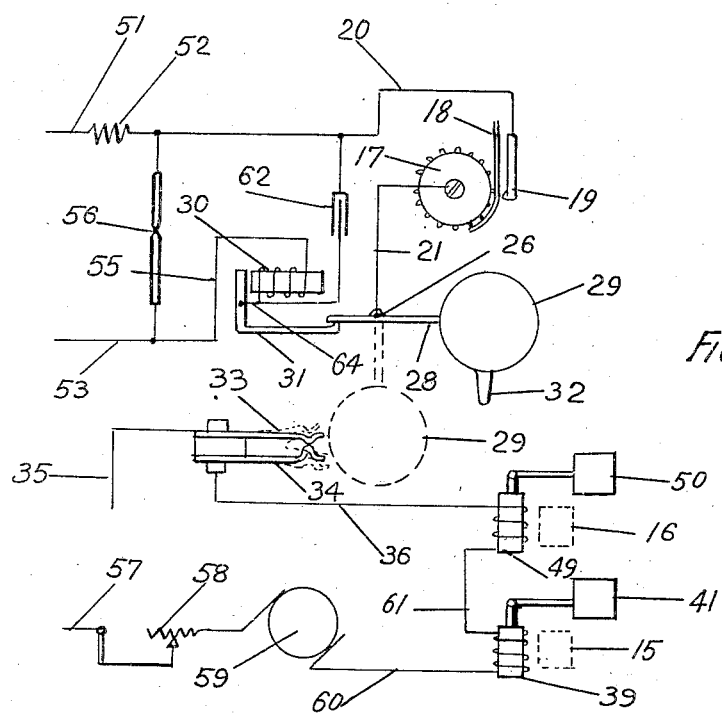
Fig. 8 is a diagram of the electric connections through the whole apparatus.

The same electro-mechanical device is associated with the peep-hole 16 and need not be again described, but for the purpose of differentiating the solenoid and shutter associated with the peep-hole 16 are indicated in Figs. 1 and 8 by reference numbers 49 and 50 respectively.

The electrical lay-out and the operation and co-action of the parts is as follows:—

The projector arc-lamp 56 is connected in parallel across positive lead 51 (in which is a resistance 52) and negative lead 53. Assuming that the fire-shutter is retained in the inoperative position by rod 31 as shown in Fig. 3 and the film 18 is interposed between contact 19 and Maltese cross 17 as in Figs. 1, 2 and 8, the circuit, which includes the winding of solenoid 30 (see Fig. 8), is broken at contact 19 and solenoid 30 remains de-energized. Should the film 18 break and the leading portion be withdrawn from between contact 19 and Maltese cross 17, a circuit is immediately closed through lead 20, contact 19, Maltese cross 17, lead 21, pivot pin 26, lever 28, rod 31, lead 64, solenoid 30, lead 55 to negative lead 53. Solenoid 30 being thus immediately energized, rod 31 is withdrawn from lever 28 and the fire-shield 29 falls to functional position covering aperture 23 in plate 22. The separation of rod 31 and lever 28 again breaks the circuit so that those parts which require to be manipulated to restore them to normal position are "dead" and therefore harmless.

To eliminate possible sparking due to the sudden opening of the circuit, a condenser 62 is connected between lead 20 and lead 64.

The other or shutter controlling circuit is meanwhile closed through positive lead 57, (see Fig. 8) rheostat 58, motor 59, lead 60, solenoid 39, lead 61, solenoid 49, lead 36, contacts 34 and 33 to negative lead 35. When fire shield 29 falls to functional position the insulating block 32 breaks contacts 33 and 34 so that the circuit is opened, solenoids 39 and 49 are de-energized, and shutters 41 and 50 fall.

I have described how my invention may be carried into effect but it is to be understood that it is not confined to the actual details of construction as these may be varied in many ways without departing from the scope of the invention as defined by the appended claims.

What I claim and desire to secure by Letters Patent is:—

1. In motion picture projection apparatus automatically operated means for preventing ignition of the portion of a broken film remaining in the film guide, said means comprising, in combination, a plate fixed on the end of the projector, a pivot pin fixed in and insulated from said plate, a lever pivoted on said pin, a fire-shield fixed on one end of said lever, a solenoid mounted on said plate, a detent rod actuated by said solenoid (when energized) and engaging the other end of said lever to retain it and the fire shield in normal position, said rod being electrically connected to one of the terminals of the solenoid windings, and also in electric communication through the lever with said pin, a pair of electrical contacts one of which is of spring type positioned near the gate in the path of and normally separated by the film, an electric lead connecting one of said contacts with said pivot pin, and another electric lead connecting the other contact with the other terminal of the solenoid windings, said leads being coupled to a source of electrical energy, all operating and coacting as and for the purpose set forth.

2. In motion picture projection apparatus including a fire-shield movable into the path of the light beam from the projector and controlled by an electrically operated device in a circuit controlled by the film in the film guide, a shutter movable to cover an aperture in the wall of the operating room in which the apparatus is installed, a solenoid controlling said shutter and connected to an electric circuit including a pair of normally closed contacts, and an insulating block inserted between said contacts by the movement of said fire-shield.

3. In motion picture projection apparatus including a fire-shield movable into the path of the light beam from the projector and controlled by an electrically operated device in a circuit controlled by the film in the film guide, a shutter movable to cover an aperture in the wall of the operating room in which the apparatus is installed, a solenoid connected to an electric circuit including a pair of normally closed spring contacts, means actuated by the movement of the fire-shield to separate said contacts and open the circuit, mechanism connected to said shutter and actuated by the solenoid to hold the shutter in position to expose said aperture when the solenoid is energized and permitting said shutter to move to functional position when the solenoid circuit is broken.

4. Apparatus according to claim 2 further characterized in that the circuit of the shutter controlling solenoid also includes the motor actuating the film progressing mechanism.

Signed at Sydney, New South Wales, this fourth day of November, A. D. 1927.

FREDERICK BROOK.